United States Patent
Adachi et al.

(10) Patent No.: US 11,507,625 B2
(45) Date of Patent: Nov. 22, 2022

(54) QUERY GENERATION SYSTEM, SEARCH SYSTEM, AND NON-TRANSITORY COMPUTER READABLE MEDIUM

(71) Applicant: FUJIFILM BUSINESS INNOVATION CORP., Tokyo (JP)

(72) Inventors: Shintaro Adachi, Kanagawa (JP); Akinobu Yamaguchi, Kanagawa (JP); Daigo Horie, Kanagawa (JP); Yang Liu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 63 days.

(21) Appl. No.: 16/864,255

(22) Filed: May 1, 2020

(65) Prior Publication Data
US 2021/0117482 A1    Apr. 22, 2021

(30) Foreign Application Priority Data

Oct. 18, 2019    (JP) .............................. JP2019-191531

(51) Int. Cl.
*G06F 16/00* (2019.01)
*G06F 16/903* (2019.01)
*G06F 16/242* (2019.01)

(52) U.S. Cl.
CPC ...... *G06F 16/90348* (2019.01); *G06F 16/242* (2019.01)

(58) Field of Classification Search
CPC ................. G06F 16/583; G06F 16/242; G06F 16/90332; G06F 16/90348; G06F 16/903; G06N 5/00
See application file for complete search history.

(56) References Cited

U.S. PATENT DOCUMENTS

| | | | |
|---|---|---|---|
| 2014/0304661 A1* | 10/2014 | Topakas | G06F 3/04847 715/848 |
| 2016/0140123 A1* | 5/2016 | Chang | G06F 16/24522 707/760 |
| 2018/0239815 A1* | 8/2018 | Yi | G06K 9/6201 |
| 2021/0191506 A1* | 6/2021 | Wang | G06N 5/02 |

FOREIGN PATENT DOCUMENTS

JP    2002-297659 A    10/2002

OTHER PUBLICATIONS

Nov. 13, 2020 Office Action issued in Australian Patent Application No. 2020203345.

* cited by examiner

*Primary Examiner* — Ashish Thomas
*Assistant Examiner* — Suman Rajaputra
(74) *Attorney, Agent, or Firm* — Oliff PLC

(57) ABSTRACT

A query generation system includes a database and a processor. The database stores information to be searched, the information being associated with features having multiple types of expressions. The processor is configured to, when a character string to be used to search the database is input without constraint on a type of expression, apply a first dictionary to a character string having a first type of expression, which is included in the input character string, to generate a query for a search from the character string having the first type of expression.

12 Claims, 14 Drawing Sheets

FIG. 4

| INPUT INFORMATION | EXAMPLE |
|---|---|
| PREMISE INFORMATION | LOCATION, LAND CHARACTERISTICS INFORMATION, TYPE OF HOUSING, BUDGET, WITH OR WITHOUT GARDEN, WITH OR WITHOUT GARAGE, FAMILY MAKEUP, NUMBER OF GENERATIONS IN HOUSEHOLD, ... |
| IMAGE INFORMATION | HAND-DRAWN ILLUSTRATION, PHOTOGRAPH, LEAFLET, CG, ... |
| STRUCTURAL INFORMATION TEXT | TWO-FAMILY HOUSE, TEN-MINUTE WALK, BUNGALOW, WOOD HOUSE, ... |
| EMOTIONAL INFORMATION TEXT | OPEN, FAMILY GATHERING, JAPANESE-STYLE INTERIOR, OF WOOD, ... |

FIG. 5
CATEGORY: LIVING ROOM
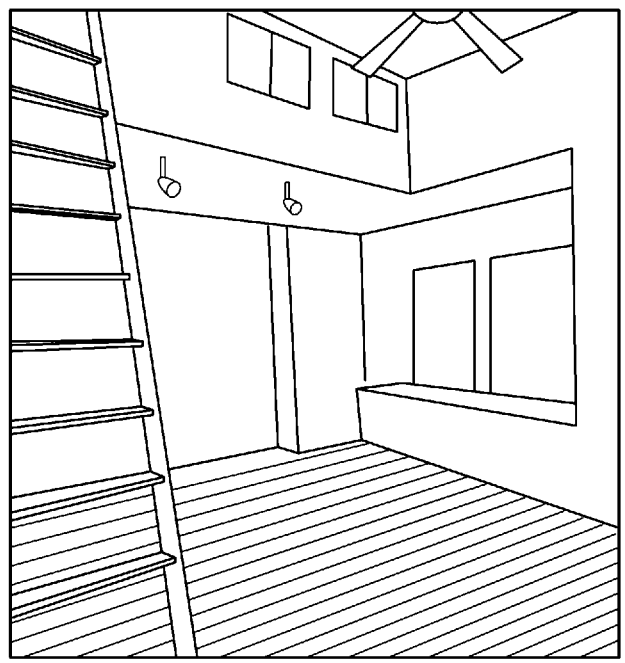
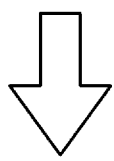 FEATURE EXTRACTION
HIGH CEILING
HIGH WINDOWS
LADDER
WOOD-FLOORED
WOOD FOR WARM FEELING
OPEN
CEILING FAN
SPOTLIGHTS
· · ·

FIG. 8

OPEN AND BRIGHT KITCHEN, TWO-GENERATION HOUSE,
HAPPY HOME SPACE WITH JAPANESE-STYLE DECOR,
HOUSE WITHIN TEN-MINUTE WALK FROM STATION, BUNGALOW,
HOUSE OF WOOD FOR WARM FEELING

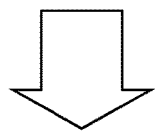
DIVISION INTO CHARACTER STRINGS

OPEN AND BRIGHT KITCHEN
TWO-GENERATION HOUSE
HAPPY HOME SPACE WITH JAPANESE-STYLE DECOR
HOUSE WITHIN TEN-MINUTE WALK FROM STATION
BUNGALOW
HOUSE OF WOOD FOR WARM FEELING

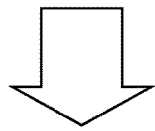
MORPHEME ANALYSIS

OPEN (ADJ) / AND (CONJ) / BRIGHT (ADJ) / KITCHEN (N)
TWO-GENERATION (ADJ) / HOUSE (N)
HAPPY (ADJ) / HOME (N) / SPACE (N) / WITH (PREP) / JAPANESE-STYLE (ADJ) / DECOR (N)
HOUSE (N) / WITHIN (PREP) / TEN-MINUTE (N) / WALK (N) / FROM (PREP) / STATION (N)
BUNGALOW (N)
HOUSE (N) / OF (PREP) / WOOD (N) / FOR / WARM (ADJ) / FEELING (N)

QUERY GENERATION SYSTEM, SEARCH SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-191531 filed Oct. 18, 2019.

BACKGROUND

(i) Technical Field

The present disclosure relates to a query generation system, a search system, and a non-transitory computer readable medium.

(ii) Related Art

To search a database that stores data of previously constructed structures for data of a desired structure, a user enters, as a query, a character string representing a feature that matches any of the features recorded in the database.

An example of the related art is shown in Japanese Unexamined Patent Application Publication No. 2002-297659.

SUMMARY

A character string entered as a query may be used to search across a plurality of databases. To increase the probability of the user's intended information being found, the query needs to contain a feature that matches any of the features recorded in each database. However, features recorded in the plurality of databases may differ in type of expression from one database to another. In this case, a query needs to be generated using a character string based on the type of expression of features recorded in each database.

Aspects of non-limiting embodiments of the present disclosure relate to the generation of a query to facilitate obtaining a user's intended search result, compared with the generation of a query without distinguishing different types of expressions of features recorded in databases.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a query generation system including a database and a processor. The database stores information to be searched, the information being associated with features having a plurality of types of expressions. The processor is configured to, when a character string to be used to search the database is input without constraint on a type of expression, apply a first dictionary to a character string having a first type of expression, which is included in the input character string, to generate a query for a search from the character string having the first type of expression.

BRIEF DESCRIPTION OF THE DRAWINGS

An exemplary embodiment of the present disclosure will be described in detail based on the following figures, wherein:

FIG. 4 is a table showing information entered as queries from a terminal operated by a user;

FIG. 5 illustrates example features extracted by a feature extraction unit;

FIG. 8 illustrates an example of morpheme analysis;

DETAILED DESCRIPTION

Figure 1:
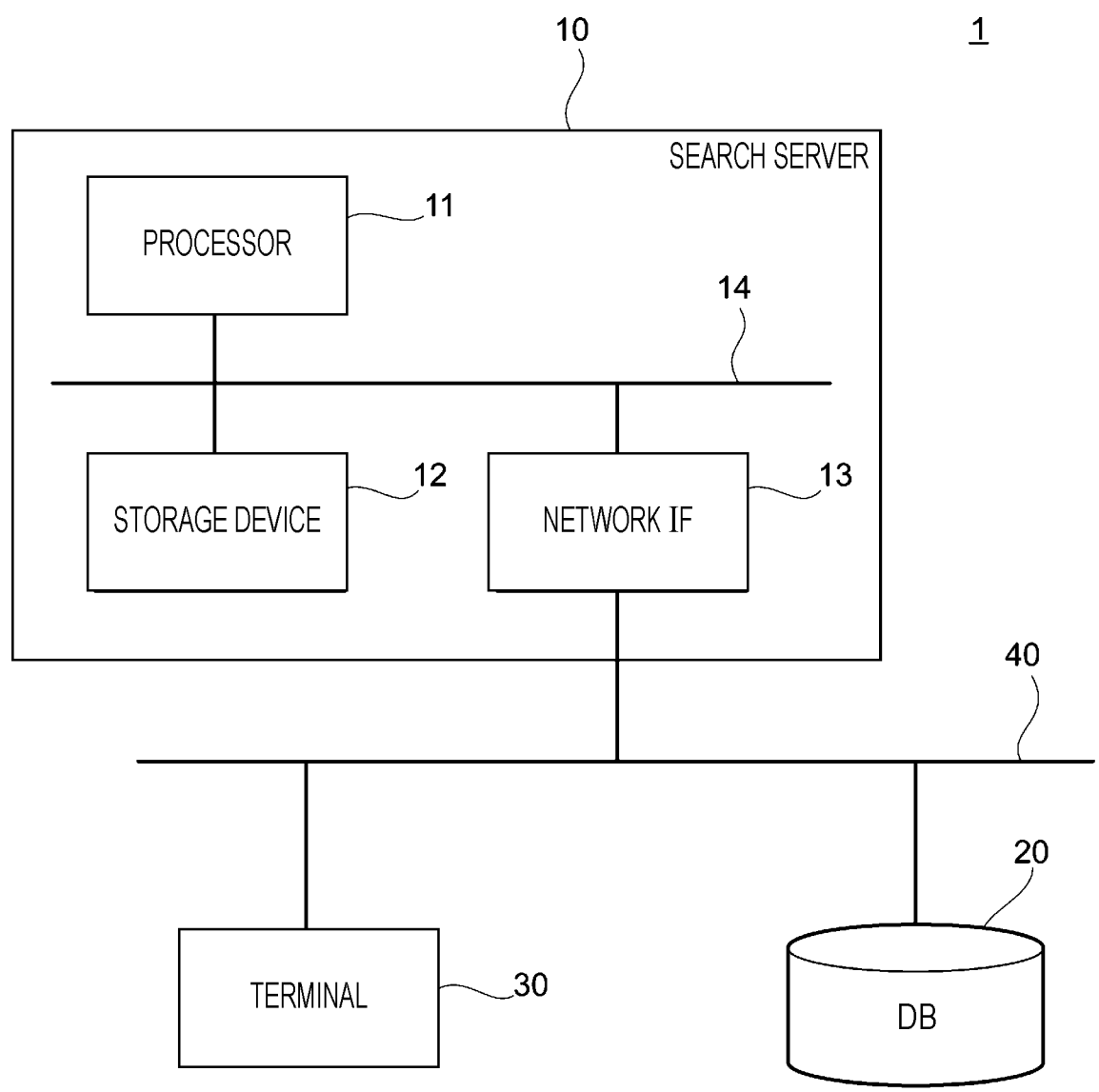
FIG. 1 illustrates an example configuration of an image search system according to an exemplary embodiment.

An exemplary embodiment of the present disclosure will be described hereinafter with reference to the drawings.
Exemplary Embodiment
The following describes an image search system. The image search system is intended to be used in architectural design firms.

In architectural design firms and the like, the records of previous works are maintained. The records include images such as design plans and design sketches, and documents of complaints from clients, accidents and incidents, in-house reviews, and so on. The image search system according to this exemplary embodiment supports efficient design processes with the use of such records.
System Configuration FIG. 1 illustrates an example configuration of an image search system 1 according to an exemplary embodiment.

The image search system 1 illustrated in FIG. 1 includes a search server 10 that searches for an image similar to or related to an input query, a database 20 that stores data of images to be searched (hereinafter referred to as "image data"), a terminal 30 operated by a user to enter a query, and a network 40 via which the search server 10, the database 20, and the terminal 30 are communicably connected to one another. The network 40 may be a local area network or the Internet. The image search system 1 is an example of a search system.

The search server 10 illustrated in FIG. 1 includes a processor 11 that performs searches and other processes in accordance with execution of a program, a storage device 12 that stores programs and various data, a network interface (IF) 13 that implements communication with external devices, and a signal line 14 such as a bus via which the processor 11, the storage device 12, and the network IF 13 are connected to one another.

The processor 11 is constituted by, for example, a central processing unit (CPU). The storage device 12 is constituted by, for example, a read only memory (ROM) that stores a basic input output system (BIOS) and so on, a random access memory (RAM) used as a work area, and a hard disk device that stores a basic program, application programs, and so on. The ROM and the RAM may be included in a portion of the processor 11. The processor 11 and the storage device 12 constitute a computer.

The database 20 illustrated in FIG. 1 contains records including images such as design plans and design sketches and documents of complaints from clients, accidents and incidents, in-house reviews, and so on. These records are collectively referred to as a "log".

The records in the log are each associated with a tag for search purposes. Each tag is provided as a set of feature values (hereinafter referred to as "features") included in the corresponding record. In this exemplary embodiment, a set of features is also referred to as a data set.

The terminal 30 illustrated in FIG. 1 is a computer. The terminal 30 may be a desktop computer, a notebook computer, or a mobile computer such as a smartphone or a wearable terminal. While a single terminal 30 is illustrated in FIG. 1, any number of terminals 30 may be used.

The search server 10 may not be implemented as a single computer, but may be implemented as a plurality of computers that cooperate with each other. The search server 10 according to this exemplary embodiment is an example of a query generation system and is also an example of a search system.

Functional Configuration

Figure 2:
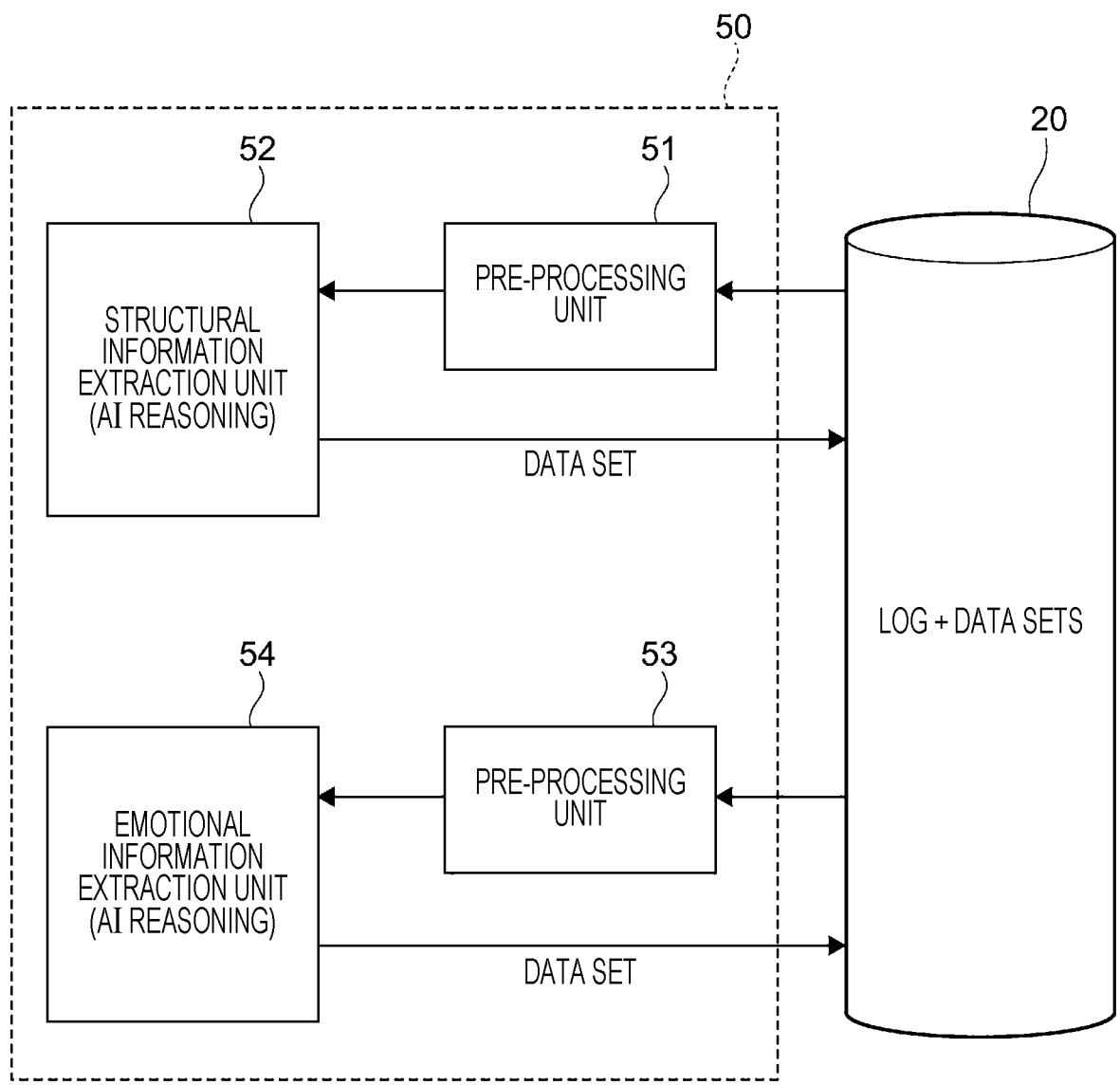
FIG. 2 illustrates a functional configuration of a computer that generates data sets to be recorded in a database.

FIG. 2 illustrates a functional configuration of a computer 50 that generates data sets to be recorded in the database 20.

The computer 50 has a hardware configuration similar to that of the search server 10 illustrated in FIG. 1. That is, the computer 50 includes a processor, a storage device, and an interface used to communicate with the database 20.

Upon reading the log from the database 20, the computer 50 performs pre-processing on the log using a pre-processing unit 51 and provides the pre-processing result to a structural information extraction unit 52. The pre-processing unit 51 is used to extract features that are classified as being associated with structural expression. A feature classified as being associated with structural expression is hereinafter referred to as "structural information". In FIG. 2, the structural information extraction unit 52 infers one or more features included in the log from reasoning using an inference model that has learned each of the features, and outputs the set of inferred features to the database 20 as a data set to be associated with the log.

In this exemplary embodiment, an inference model is prepared for each feature. Inference models are generated in advance by means of machine learning or the like. In FIG. 2, reasoning using an inference model is referred to as artificial intelligence (AI) reasoning.

Upon reading the log from the database 20, the computer 50 performs pre-processing on the log using a pre-processing unit 53 and provides the pre-processing result to an emotional information extraction unit 54. The pre-processing unit 53 is used to extract features that are classified as being associated with emotional expression. A feature classified as being associated with emotional expression is hereinafter referred to as "emotional information". In this exemplary embodiment, emotional information refers to a feature that is not associated with structural expression or quantitative expression. In other words, emotional information refers to a feature that is associated with qualitative or subjective expression. The emotional expression is an example of a first type of expression.

In FIG. 2, the emotional information extraction unit 54 infers one or more pieces of emotional information included in the log from reasoning using an inference model that has learned emotional information, and outputs the set of pieces of inferred emotional information to the database 20 as a data set to be associated with the log. In this exemplary embodiment, an inference model is prepared for each piece of emotional information. Inference models are generated in advance by means of machine learning or the like.

Accordingly, the log stored in the database 20 is associated with one or more features, each of which belongs to either or both of the structural information and the emotional information.

Figure 3:
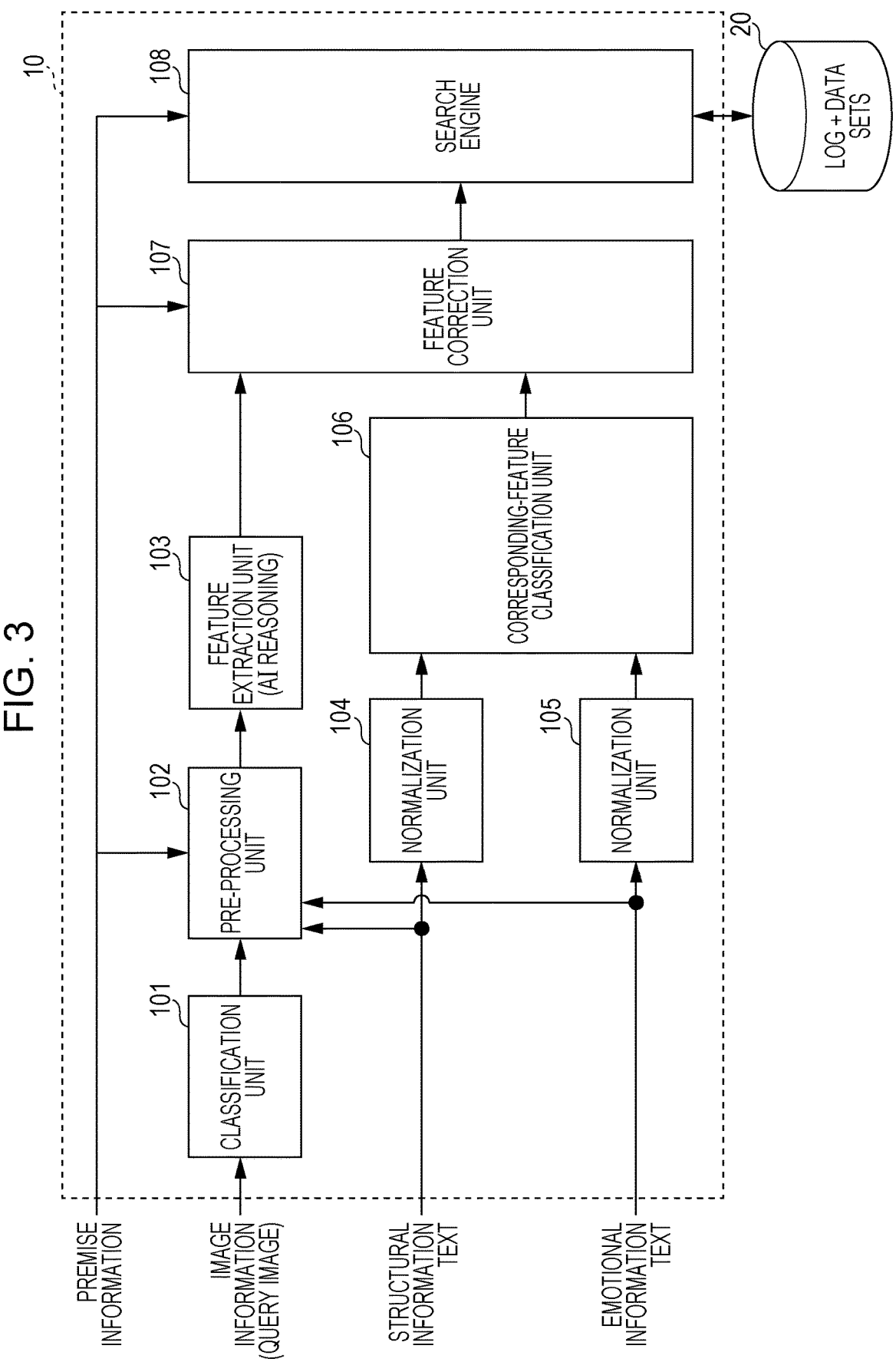
FIG. 3 illustrates a functional configuration of a search server that searches the database for an image similar to or related to an image entered as a query.

FIG. 3 illustrates a functional configuration of the search server 10 that searches the database 20 for an image similar to or related to an image entered as a query (hereinafter referred to as a "query image").

The search server 10 functions as a classification unit 101, a pre-processing unit 102, a feature extraction unit 103, a normalization unit 104, a normalization unit 105, a corresponding-feature classification unit 106, a feature correction unit 107, and a search engine 108. The classification unit 101 classifies query images by target. The pre-processing unit 102 applies predetermined processing to each of the query images. The feature extraction unit 103 extracts feature values (hereinafter referred to as "features") from the query image. The normalization unit 104 corrects subtle differences in expression in a text containing structural expression (hereinafter referred to as a "structural information text"). The normalization unit 105 corrects subtle differences in expression in a text containing emotional expression (hereinafter referred to as an "emotional information text"). The corresponding-feature classification unit 106 classifies features associated with character strings in a structural information text or an emotional information text. The feature correction unit 107 corrects a feature to be provided to the search engine 108. The search engine 108 searches the database 20 for a record with high relevance to the corrected feature.

The functions described above are implemented in accordance with a program executed by the processor 11 (see FIG. 1). The components of the search server 10, except for the search engine 108, are examples of a search condition identifying system.

The search server 10 according to this exemplary embodiment receives premise information, image information, a structural information text, and an emotional information text, which are entered as a query from the terminal 30 (see FIG. 1). The query is hereinafter also referred to as a "search query".

Note that not all the four types of information described above may be entered as a query. In this exemplary embodiment, furthermore, a structural information text and an emotional information text need not be clearly distinguished from each other. Actually, there is no constraint on the type of expression used to enter a text. This enables the user to enter a character string expressing their wishes to search the log without distinguishing between a structural information text and an emotional information text.

FIG. 4 is a table showing information entered as queries from the terminal 30 operated by the user.

The premise information is structural or quantitative information having higher priority than any other query among queries entered by the user. The premise information also includes laws. The premise information is an example of a condition related to the target to be searched for.

In this exemplary embodiment, a building-related image is the target to be searched for.

Examples of the premise information include location, the area of land, site conditions, the surrounding environment, the type of housing, the budget, whether a garden is wanted, whether a vehicle is owned, whether a garage is needed, family makeup, and the number of generations in the household. Examples of the type of housing include residential building, apartment, and detached house.

The image information is a query image. The image information is provided as, for example, a hand-drawn illustration, a photograph, a leaflet, or a computer graphic (CG) image. In this exemplary embodiment, the image information has lower priority than any other type of query.

The structural information text is a text containing structural expression. Examples of the structural information text include "two-generation house", "ten-minute walk", "bungalow", and "house of wood".

The emotional information text is a text containing emotional expression. Examples of the emotional information text include "open", "happy home", "space with Japanese-style decor", and "wood for warm feeling".

The structural information text and the emotional information text may be entered without being clearly distinguished from each other. Examples of the text containing both structural expression and emotional expression include "open and bright kitchen". The word "kitchen" is a clearly identifiable noun and is thus a structural expression. The words "open" and "bright" are adjectives describing tone, feelings, or emotions and are thus emotional expressions.

Referring back to FIG. 3, the classification unit 101 classifies query images entered by the user by target. In this exemplary embodiment, each of the query images is classified as any one of an image of a living room, an image of a kitchen, and an image of the exterior of a house. It should be noted that the number of candidate types used for classification is not limited to three. Other candidate types include, for example, child's room, bedroom, bathroom, toilet, entrance, and garden. The classification unit 101 adds the classification result as the attribute of each individual query image.

The pre-processing unit 102 applies predetermined processing to an input query image. Examples of the predetermined processing include size adjustment, contrast adjustment, edge enhancement, and noise removal.

Additionally, the pre-processing unit 102 illustrated in FIG. 3 further has a function of removing or erasing a portion inconsistent with other conditions from a query image. This function is one of the pre-processing operations. Examples of the function include correction. Specifically, if the query image includes a garage although the premise information indicates no need of a garage, the pre-processing unit 102 erases the garage from the query image. The term "inconsistent" is used to mean that statements are conflicting or contradictory. In this exemplary embodiment, an inconsistent portion may be a mismatched portion.

The correction of a portion inconsistent with other conditions is optional.

The feature extraction unit 103 performs a check against inference models, each of which is created for a feature by means of machine learning or the like, to extract one or more features from the query image.

FIG. 5 illustrates example features extracted by the feature extraction unit 103. In FIG. 5, the words "high ceiling", "high windows", "ladder", "wood-floored", "wood for warm feeling", "open", "ceiling fan", "spotlights", etc. are extracted as features from a photograph of a living room, which is entered as a query image.

Referring back to FIG. 3, the normalization unit 104 corrects subtle differences in expression in a structural information text entered by the user as a query. Examples of the correction of subtle differences in expression include unifying font types, and correcting misspelling and typos.

The normalization unit 105 corrects subtle differences in expression in an emotional information text entered by the user as a query. The normalization unit 105 also corrects variations of expressions for individuals.

The corresponding-feature classification unit 106 classifies character strings in a structural information text or an emotional information text to determine whether each of the character strings corresponds to a structural feature, an emotional feature, or both. The corresponding-feature classification unit 106 may perform classification by, for example, reasoning based on inference models generated in advance. The corresponding-feature classification unit 106 according to this exemplary embodiment is an example of a query generation system.

The feature correction unit 107 performs a process of correcting a feature to be provided to the search engine 108 to facilitate obtaining the user's intended search result. The feature correction unit 107 according to this exemplary embodiment eliminates inconsistency between features that are extracted. In one example, the feature correction unit 107 performs correction to remove a feature inconsistent with premise information among the features extracted from the query image. In another example, the feature correction unit 107 performs correction to remove a feature inconsistent among a plurality of query images.

Processing of Corresponding-Feature Classification Unit

The following describes a functional configuration of the corresponding-feature classification unit 106 and the details of the process performed by the corresponding-feature classification unit 106.

Figure 6:
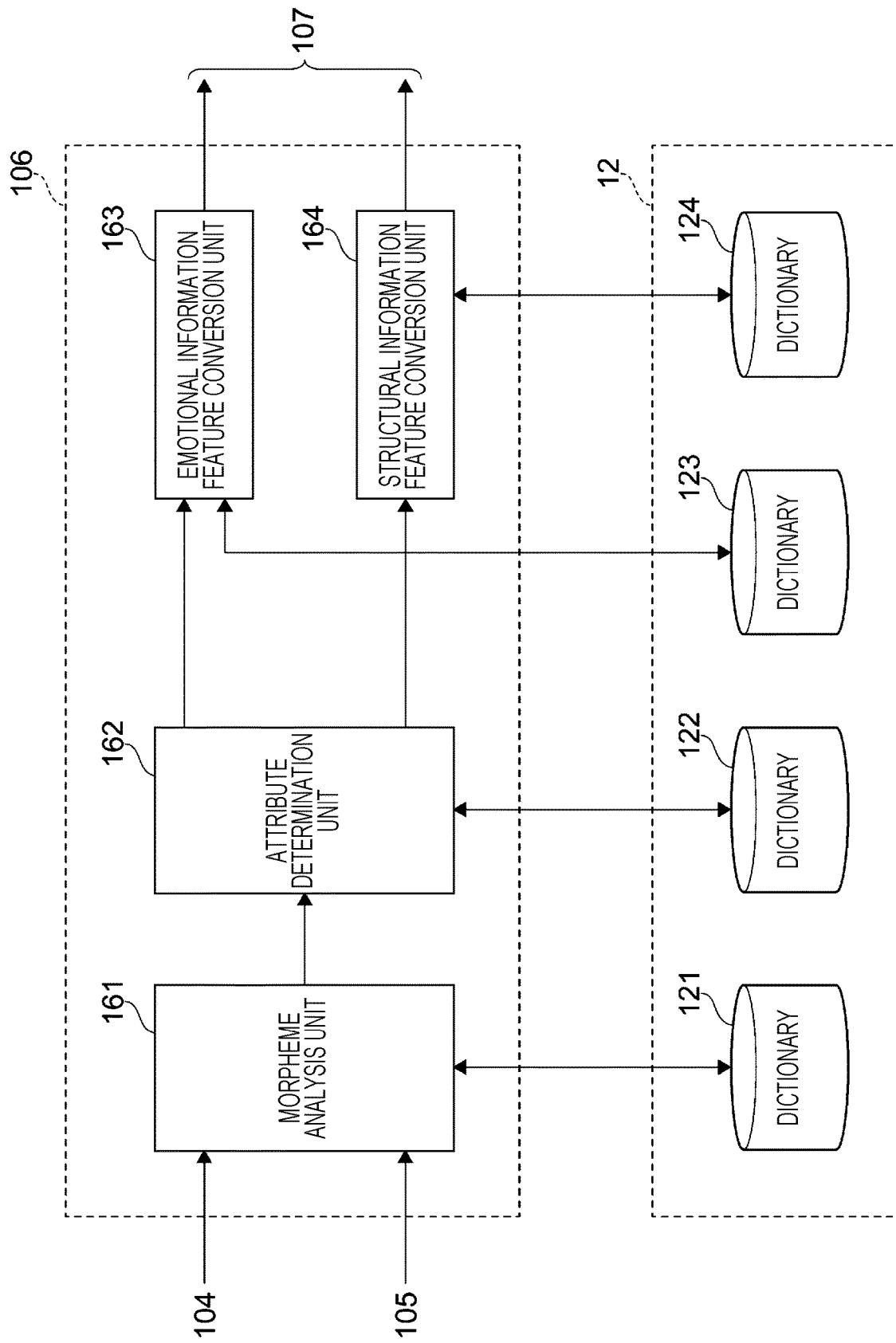
FIG. 6 illustrates an example functional configuration of a corresponding-feature classification unit.

FIG. 6 illustrates an example functional configuration of the corresponding-feature classification unit 106.

The corresponding-feature classification unit 106 according to this exemplary embodiment functions as a morpheme analysis unit 161, an attribute determination unit 162, an emotional information feature conversion unit 163, and a structural information feature conversion unit 164. The morpheme analysis unit 161 analyzes morphemes in an input text. The attribute determination unit 162 determines the attribute of an individual character string using an analysis result. The emotional information feature conversion unit 163 converts a character string determined as representing emotional information by the attribute determination unit 162 into a feature. The structural information feature conversion unit 164 converts a character string determined as representing structural information by the attribute determination unit 162 into a feature.

The storage device 12 stores dictionaries 121 to 124. The dictionary 121 is used for analysis in the morpheme analysis unit 161. The dictionary 122 is used for determination in the attribute determination unit 162. The dictionary 123 is used by the emotional information feature conversion unit 163. The dictionary 124 is used by the structural information feature conversion unit 164.

The dictionary 121 stores information on words and their parts of speech.

The dictionary 122 stores rules for classifying a character string as representing emotional information, rules for classifying a character string as representing structural information, and rules for classifying a character string as representing both emotional information and structural information. The dictionary 122 also includes a dictionary containing nouns classified as carrying structural information, and a dictionary containing adjectives classified as carrying structural information. The dictionary 122 is an example of a third dictionary.

The dictionary 123 stores a relationship between emotional information that has been learned in advance and characteristics enabled in the database 20 (see FIG. 1). The dictionary 123 is an example of a first dictionary.

The dictionary 124 stores a relationship between structural information that has been learned in advance and characteristics enabled in the database 20. The dictionary 124 is an example of a second dictionary.

Figure 7:
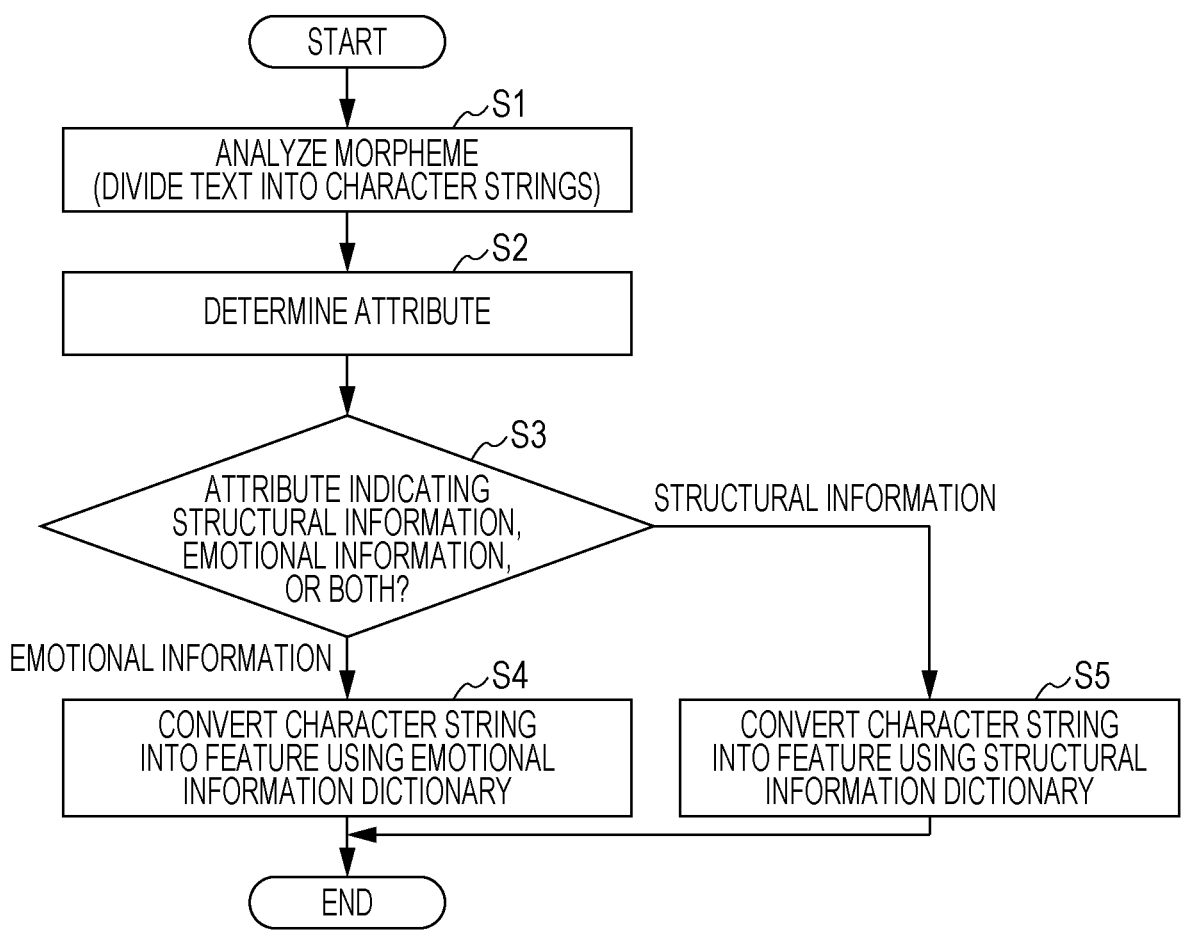
FIG. 7 is a flowchart illustrating an example process performed by a processor serving as the corresponding-feature classification unit.

FIG. 7 is a flowchart illustrating an example process performed by the processor 11 (see FIG. 1), which functions as the corresponding-feature classification unit 106. In FIG. 7, label "S" indicates step.

First, the processor 11 analyzes morphemes in a text entered by the user (step 1). The processing of step 1 corresponds to the processing performed by the morpheme analysis unit 161 (see FIG. 6).

In step 1, the processor 11 extracts character strings appearing before or after delimiters or character strings placed between delimiters from an input text, and inserts vertical lines ("I") between character strings to divide the input text into character strings. Examples of the delimiters include commas and periods. Further, the processor 11 divides each of the character strings into morphemes and determines the part of speech of each morpheme. The term "morpheme", as used herein, refers to an element having a meaning in a language and is sometimes used to mean a word.

FIG. 8 illustrates an example of morpheme analysis.

In the example illustrated in FIG. 8, the text "open and bright kitchen, two-generation house, happy home space with Japanese-style decor, house within ten-minute walk from station, bungalow, house of wood for warm feeling" is input. The input text contains commas.

In FIG. 8, the input text is divided into character strings by vertical lines, namely, "open and bright kitchen|two-generation house|happy home space with Japanese-style decor|house within ten-minute walk from station|bungalow-|house of wood for warm feeling". In FIG. 8, a line break is inserted in place of each vertical line. Each of the character strings separated by the vertical lines is subjected to morpheme analysis.

In FIG. 8, each of the separated character strings is divided into words and their parts of speech by slashes ("/").

Referring back to FIG. 7, upon completion of the morpheme analysis, the processor 11 (see FIG. 1) determines the attribute of each character string (step 2). In attribute determination, it is determined whether the attribute of each character string indicates emotional information, structural information, or both emotional information and structural information. The processing of step 2 corresponds to the processing performed by the attribute determination unit 162 (see FIG. 6).

Upon completion of the attribute determination, the processor 11 determines where to output each character string using the determination result, namely, the attribute of the character string. In FIG. 7, the processor 11 determines whether the determined attribute indicates emotional information, structural information, or both (step 3). Both means that the character string being processed belongs to both emotional information and structural information.

After that, the processor 11 converts the character string determined as representing emotional information into a feature using the dictionary 123 for emotional information (see FIG. 6) (step 4), and converts the character string determined as representing structural information into a feature using the dictionary 124 for structural information (step 5). The character string determined as representing both emotional information and structural information is subjected to both the processing of step 4 and the processing of step 5.

Figure 9:
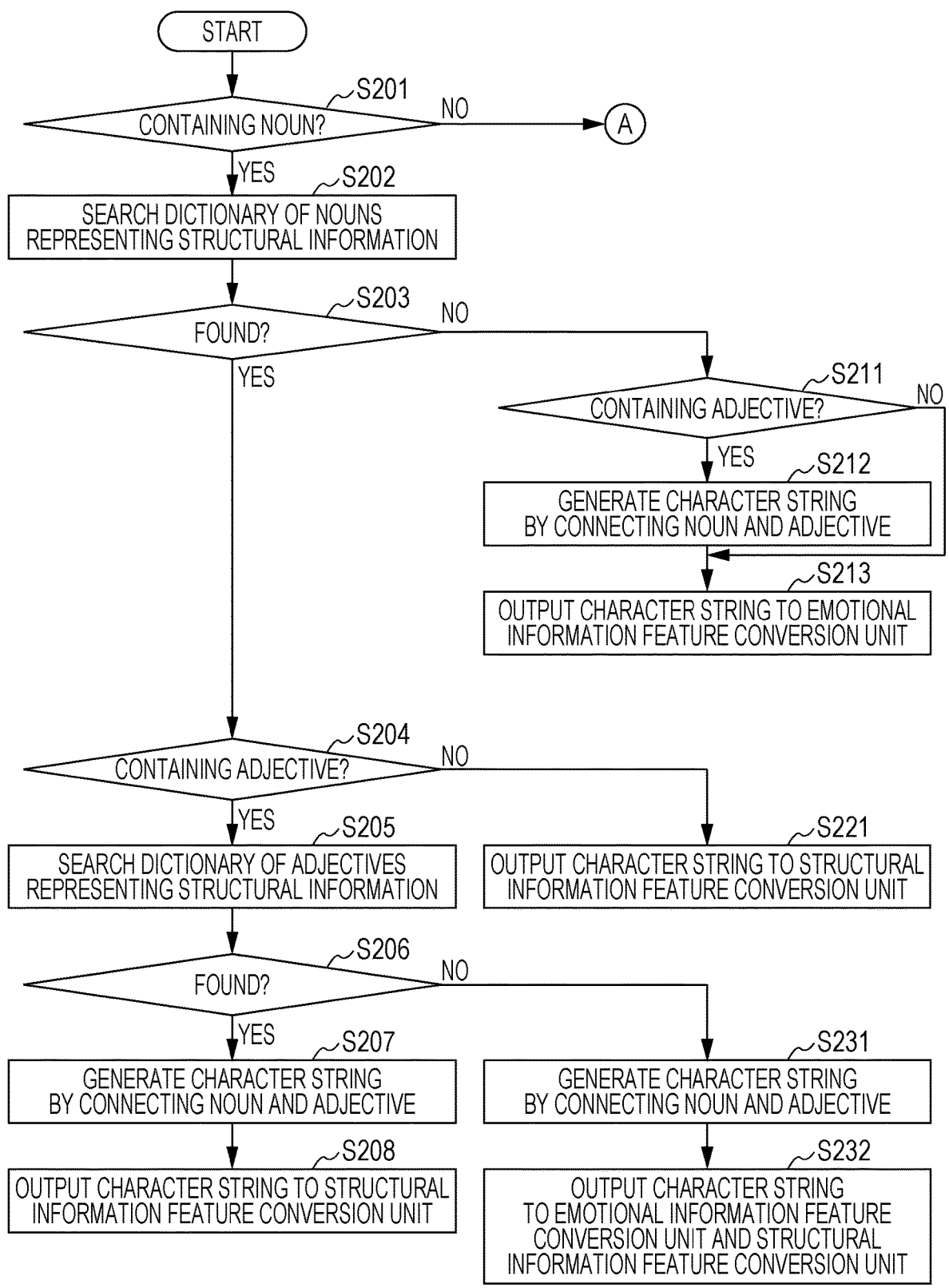
FIG. 9 is a flowchart illustrating a portion of a process used to determine the attribute of each character string.
Figure 10:
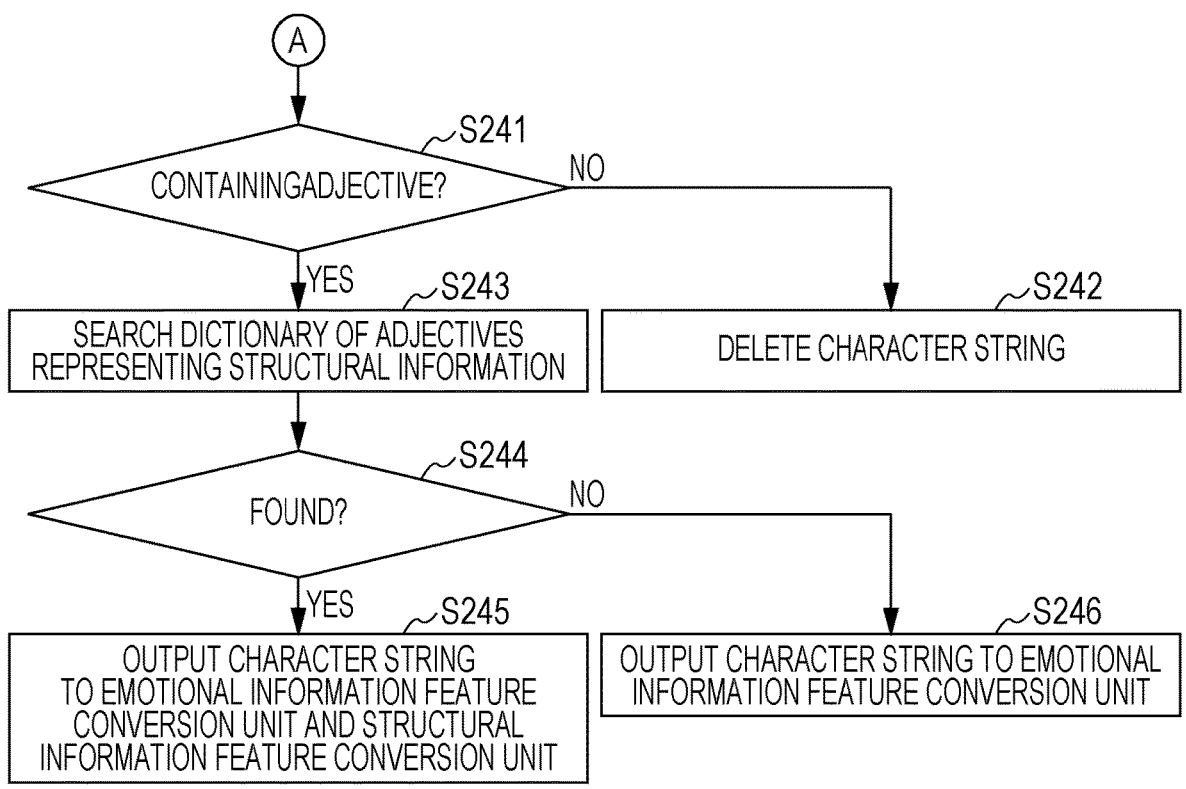
FIG. 10 is a flowchart illustrating the rest of the process used to determine the attribute of each character string.

The following describes an attribute determination process in detail with reference to FIGS. 9 and 10.

FIG. 9 is a flowchart illustrating a portion of a process used to determine the attribute of each character string. FIG. 10 is a flowchart illustrating the rest of the process used to determine the attribute of each character string.

The process illustrated in FIGS. 9 and 10 is executed for each character string being processed.

First, the processor 11 determines whether the character string being processed contains a noun (step 201). Examples of the character string include a character string separated by a vertical line and a sub-character string extracted or reconfigured from a character string separated by a vertical line.

If the character string being processed contains a noun, the processor 11 obtains a positive result in step 201. If a positive result is obtained in step 201, the processor 11 searches a dictionary of nouns carrying structural information (step 202).

Then, the processor 11 determines whether the noun contained in the character string being processed is found in the dictionary (step 203).

If the noun being processed is found in the dictionary, the processor 11 obtains a positive result in step 203. If a positive result is obtained in step 203, the processor 11 determines whether the character string being processed contains an adjective (step 204).

If the character string being processed contains an adjective, the processor 11 searches a dictionary of adjectives carrying structural information (step 205).

Then, the processor 11 determines whether the adjective contained in the character string being processed is found in the dictionary (step 206).

If the adjective being processed is found in the dictionary, the processor 11 obtains a positive result in step 206. If a positive result is obtained in step 206, the processor 11 generates a character string by connecting the adjective and the noun subjected to determination in steps 203 and 206 (step 207).

Then, the processor 11 outputs the generated character string to the structural information feature conversion unit 164 (see FIG. 6) (step 208).

If it is determined in step 203 that the noun being processed is not found in the dictionary, the processor 11 obtains a negative result in step 203. If a negative result is obtained in step 203, the processor 11 determines whether the character string being processed contains an adjective (step 211).

If the character string being processed contains an adjective, the processor 11 generates a character string by connecting the adjective and the noun subjected to determination in steps 203 and 211 (step 212). The noun to be connected is not included in the dictionary of nouns classified as carrying structural information. That is, this noun is not a noun that can be used to describe structural expression.

Then, the processor 11 outputs the generated character string to the emotional information feature conversion unit 163 (see FIG. 6) (step 213).

If the character string being processed contains no adjective, the processor 11 obtains a negative result in step 211. In this case, the character string being processed is constituted by one or more nouns. In this case, the processor 11 outputs the character string being processed to the emotional information feature conversion unit 163 (see FIG. 6) (step 213).

The description will now be given of a case where it is determined in step 204 that the character string being processed contains no adjective. In this case, the processor 11 obtains a negative result in step 204. If a negative result is obtained in step 204, the processor 11 outputs the character string being processed to the structural information feature conversion unit 164 (step 221).

The description will now be given of a case where it is determined in step 206 that the adjective contained in the character string being processed is not contained in the dictionary of adjectives classified as carrying structural information. In this case, the processor 11 obtains a negative result in step 206. If a negative result is obtained in step 206, the processor 11 generates a character string by connecting the adjective and the noun subjected to determination in steps 203 and 206 (step 231). The noun is included in the dictionary of nouns carrying structural information, whereas the adjective is not included in the dictionary of adjectives carrying structural information. That is, the generated character string includes structural information and emotional information.

The processor 11 outputs the generated character string to the emotional information feature conversion unit 163 (see FIG. 6) and the structural information feature conversion unit 164 (see FIG. 6) (step 232).

The description will now be given of a case where it is determined in step 201 that the character string being processed contains no noun. In this case, the processor 11 obtains a negative result in step 201. If a negative result is obtained in step 201, the processor 11 determines whether the character string being processed contains an adjective (step 241).

If it is determined in step 241 that the character string being processed contains no adjective, the processor 11 obtains a negative result. If a negative result is obtained in step 241, the processor 11 deletes the character string being processed (step 242). The character string deleted in step 242 is constituted by, for example, a preposition or a conjunction.

If it is determined in step 241 that the character string being processed contains an adjective, the processor 11 obtains a positive result. This determination result is obtained when the character string being processed does not contain a noun, but contains an adjective.

If a positive result is obtained in step 241, the processor 11 searches the dictionary of adjectives classified as carrying structural information (step 243).

Then, the processor 11 determines whether the adjective contained in the character string being processed is found in the dictionary (step 244).

If the adjective being processed is found in the dictionary, the processor 11 obtains a positive result in step 244. If a positive result is obtained in step 244, the processor 11 outputs the character string being processed to the emotional information feature conversion unit 163 (see FIG. 6) and the structural information feature conversion unit 164 (see FIG. 6) (step 245).

If the adjective being processed is not found in the dictionary, the processor 11 obtains a negative result in step 244. If a negative result is obtained in step 244, the processor 11 outputs the character string being processed to the emotional information feature conversion unit 163 (step 246).

First Specific Example

Figure 11:
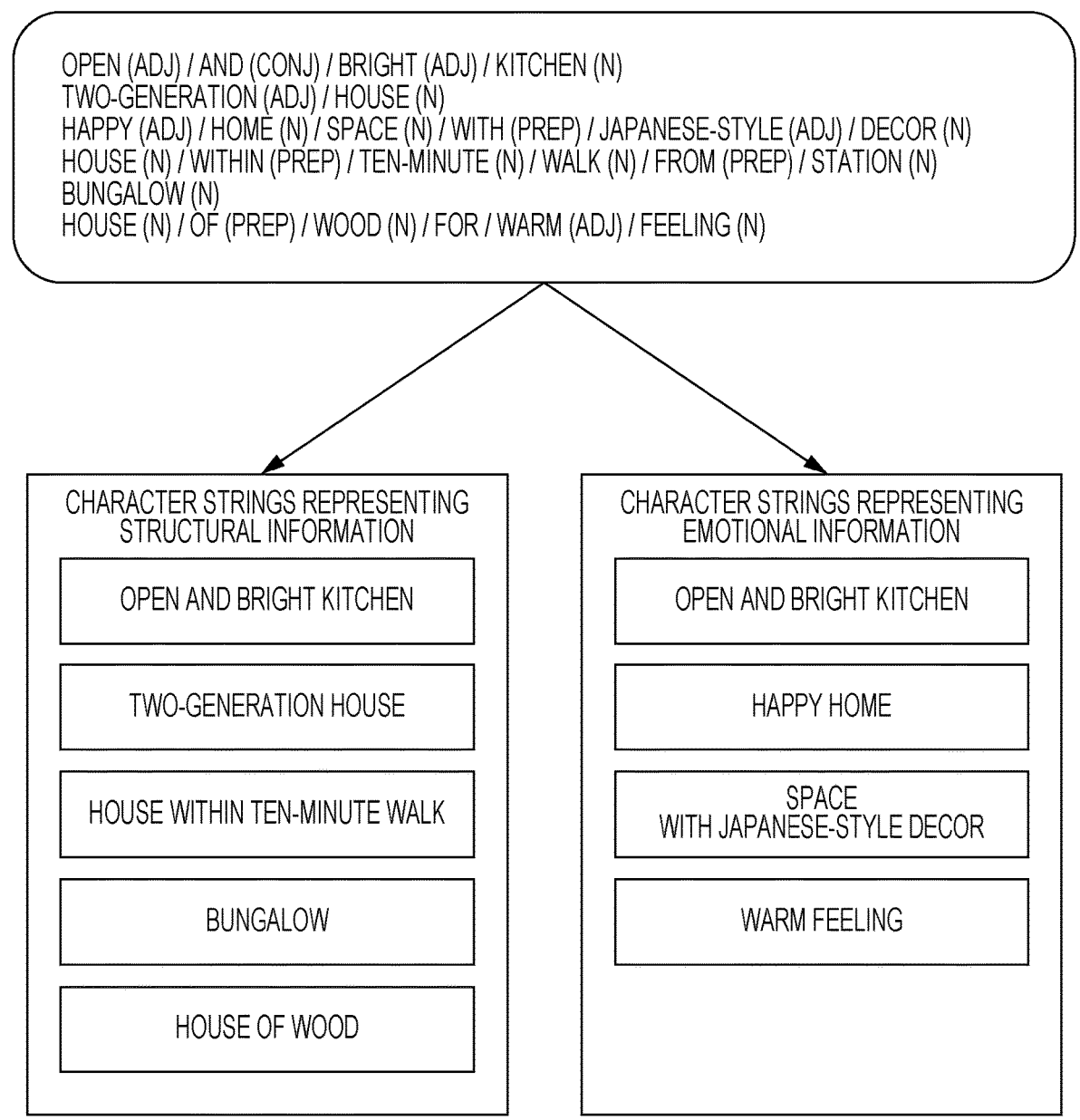
FIG. 11 illustrates a first specific example of organization based on determined attributes.

FIG. 11 illustrates a first specific example of organization based on determined attributes.

In FIG. 11, the words "open and bright kitchen", "two-generation house", "house within ten-minute walk", "bungalow", and "house of wood" are output to the structural information feature conversion unit 164 (see FIG. 6) as character strings representing structural information. The words "open and bright kitchen", "happy home", "space with Japanese-style decor", and "warm feeling" are output to the emotional information feature conversion unit 163 (see FIG. 6) as character strings representing emotional information.

Figure 12:
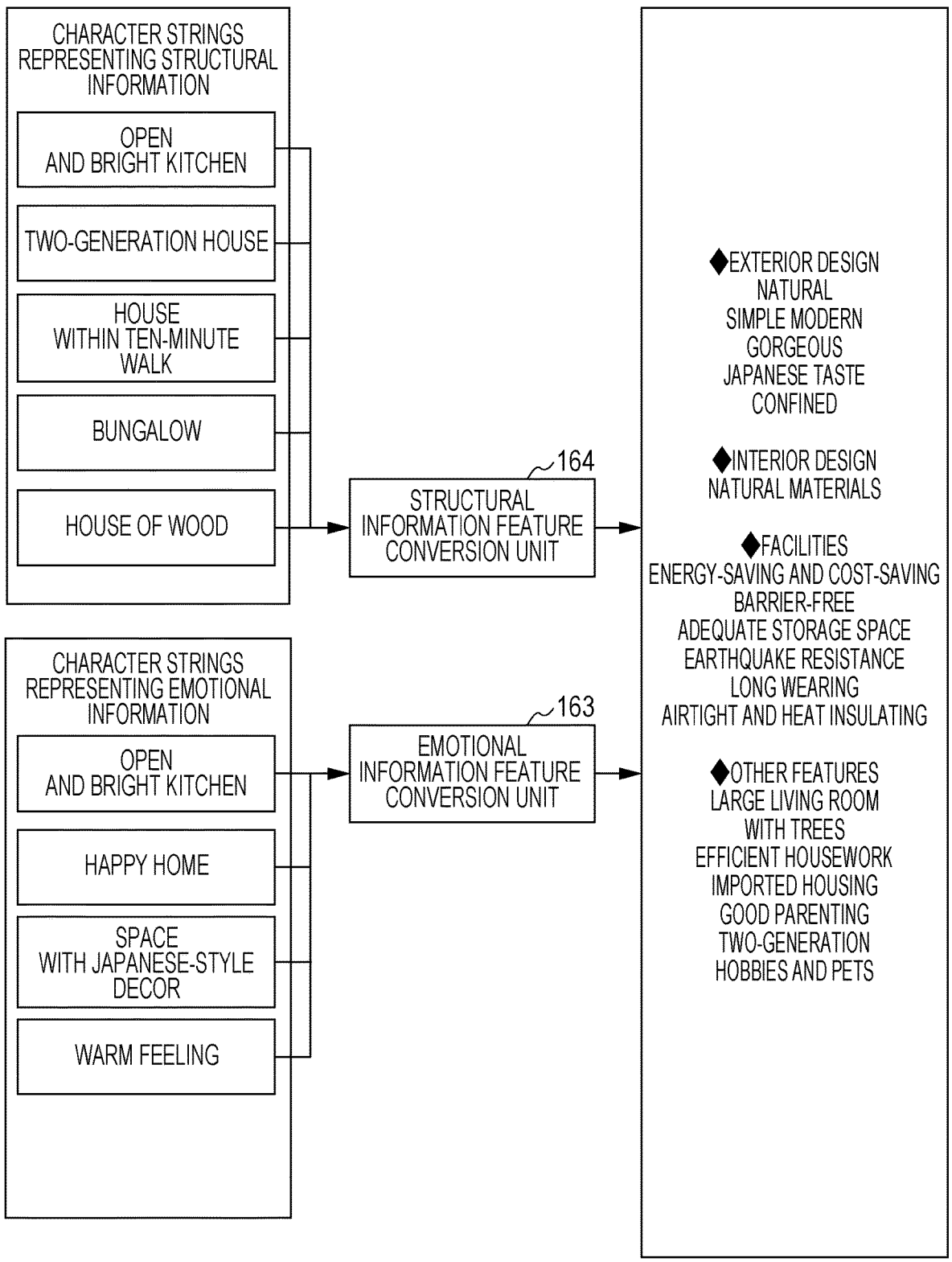
FIG. 12 illustrates an example of features output to a feature correction unit as the output of the corresponding-feature classification unit.

FIG. 12 illustrates an example of features output to the feature correction unit 107 (see FIG. 6) as the output of the corresponding-feature classification unit 106 (see FIG. 6). FIG. 12 is based on the example of the character strings illustrated in FIG. 11.

As described above, the emotional information feature conversion unit 163 converts a character string representing emotional information into a feature associated with the information in the database 20 (see FIG. 1) by using the dictionary 123. The structural information feature conversion unit 164 converts a character string representing structural information into a feature associated with the information in the database 20 by using the dictionary 124. The features obtained as a result of conversion are organized into categories for building construction, such as exterior design, interior design, and facilities.

In the example in FIG. 12, features about the exterior design, including "natural", "simple modern", "gorgeous", "Japanese taste", and "confined", are provided. Further, a feature about the interior design, including "natural materials", is provided. Further, features about the facilities, including "energy-saving and cost-saving", "barrier-free", "adequate storage space", "earthquake resistance", "long wearing", and "airtight and heat insulating", are provided. Further, other features, including "large living room", "with trees", "efficient housework", "imported housing", "good parenting", "two-generation", and "hobbies and pets", are provided.

The classification of the features illustrated in FIG. 12 is implementable by, for example, further registering, in the dictionaries 123 and 124, information about the classification for each feature to be associated with a character string. Any other implementation method may be used.

For example, when the attribute determination unit 162 (see FIG. 6) determines the attribute of each character string, the character string may be assigned a label of the related category. For example, the character string "open and bright kitchen" is assigned the label "interior" or "materials". Any other label, such as the label "exterior", may be assigned. Assigning labels to features in advance provides output similar to that in FIG. 12 by organizing the features by label even if the dictionaries 123 and 124 do not contain information about classification by feature.

Second Specific Example

Figure 13:
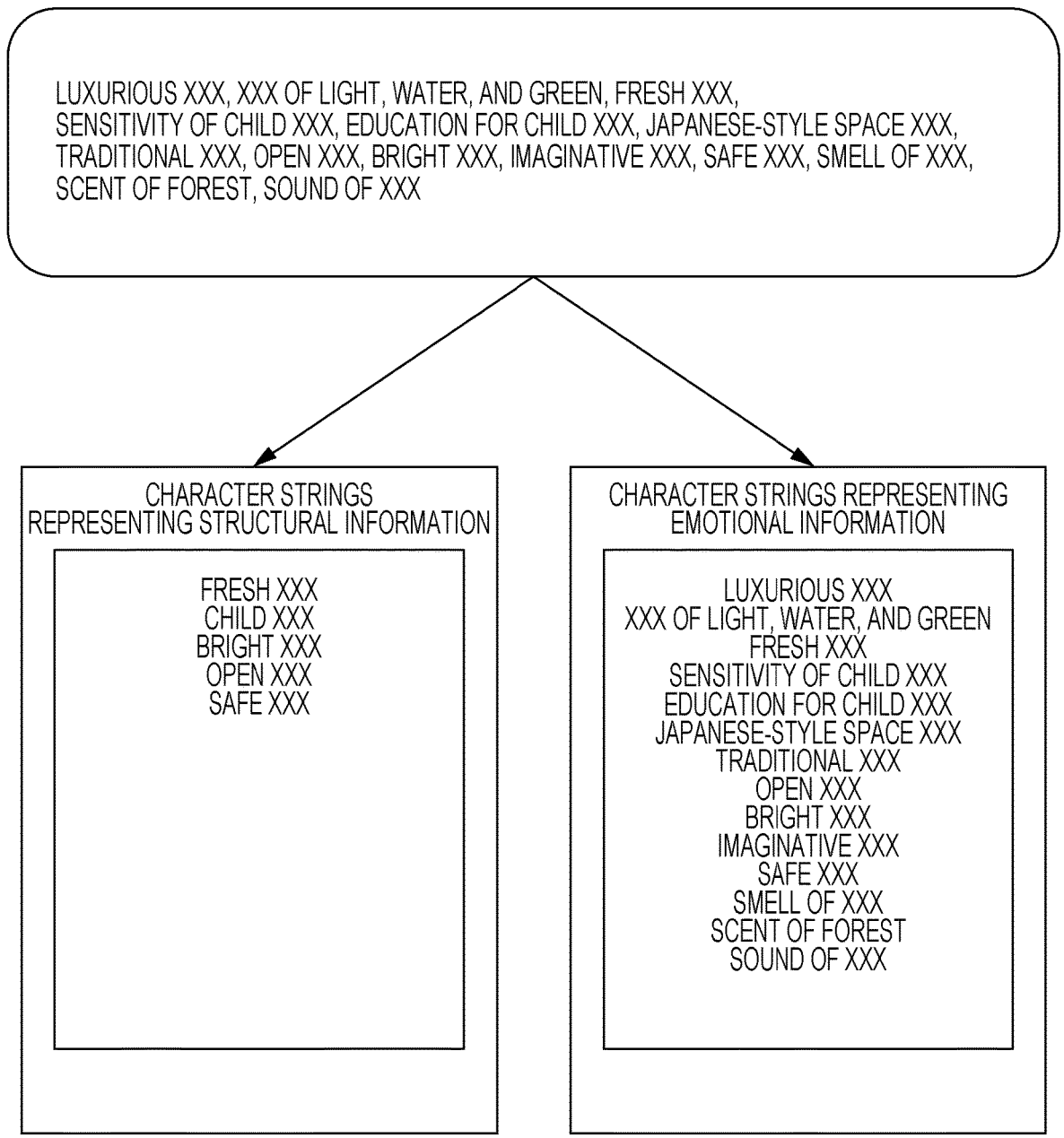
FIG. 13 illustrates a second specific example of organization based on determined attributes.

FIG. 13 illustrates a second specific example of organization based on determined attributes.

In FIG. 13, the processing results obtained by the morpheme analysis unit 161 (see FIG. 6) are not illustrated. In FIG. 13, therefore, character strings representing structural information and character strings representing emotional information are extracted directly from a text entered by the user.

In FIG. 13, the words "fresh XXX", "child XXX", "bright XXX", "open XXX", and "safe XXX" are output to the structural information feature conversion unit 164 (see FIG. 6) as character strings representing structural information. The words "luxurious XXX", "XXX of light, water, and green", "fresh XXX", "sensitivity of child XXX", "education for child XXX", "Japanese-style space XXX", "traditional XXX", "open XXX", "bright XXX", "imaginative XXX", "safe XXX", "smell of XXX", "scent of forest", and "sound of XXX" are output to the emotional information feature conversion unit 163 (see FIG. 6) as character strings representing emotional information.

Figure 14:
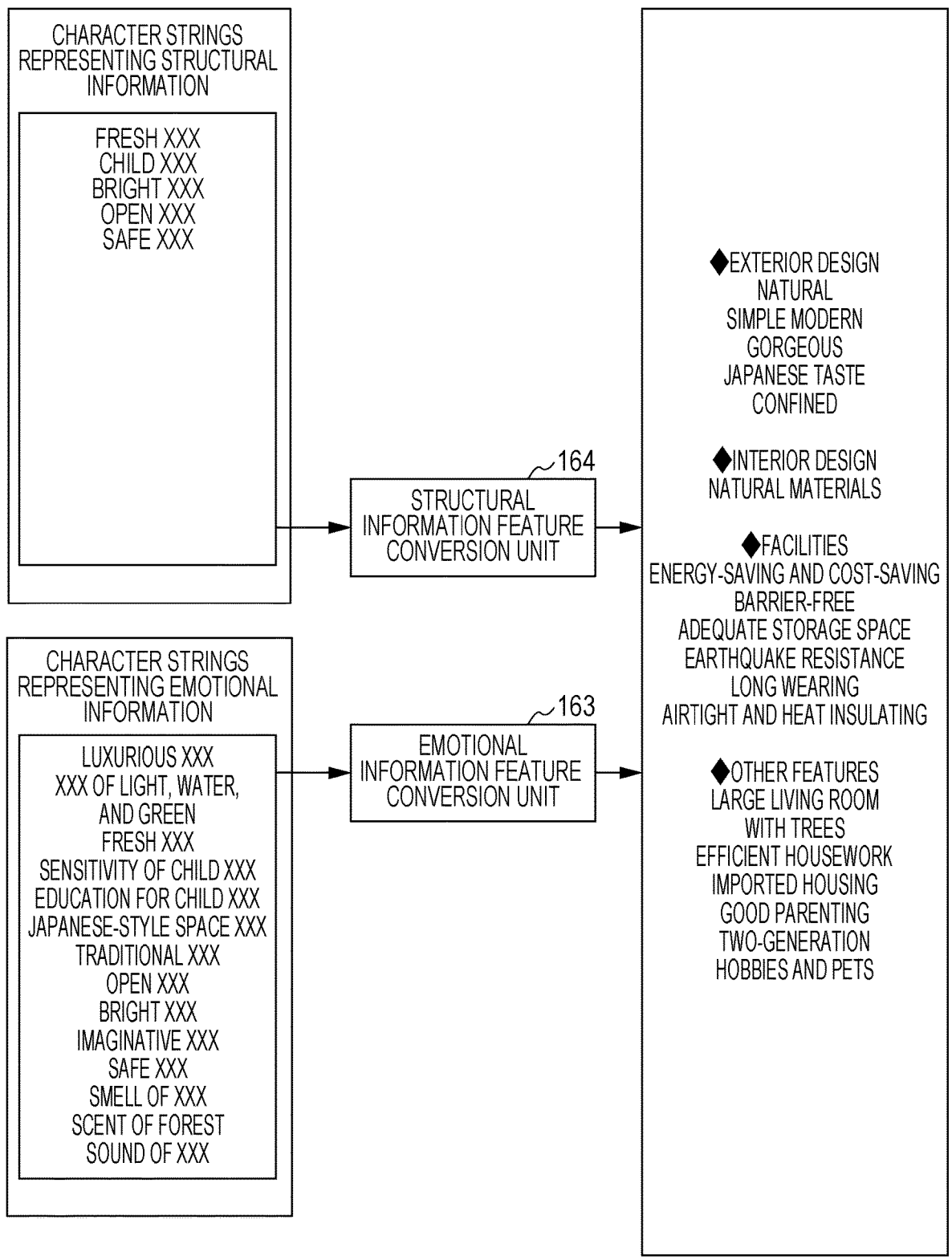
FIG. 14 illustrates another example of features output to the feature correction unit as the output of the corresponding-feature classification unit.

FIG. 14 illustrates another example of features output to the feature correction unit 107 (see FIG. 6) as the output of the corresponding-feature classification unit 106 (see FIG. 6). FIG. 14 is based on the example of the character strings illustrated in FIG. 13.

In FIG. 14, the features output to the feature correction unit 107 are the same as those illustrated in FIG. 12 described above in the first specific example. Note that the example of the features illustrated in FIG. 14 is used for convenience of description, and does not mean that the same sets of features are constantly output from the emotional information feature conversion unit 163 and the structural information feature conversion unit 164 even if different character strings are input to the emotional information feature conversion unit 163 and the structural information feature conversion unit 164.

As illustrated in FIGS. 12 and 14, the features output from the emotional information feature conversion unit 163 and the structural information feature conversion unit 164 and features in a text entered by the user are less common. This is because the user does not know in advance about features associated with the information in the database 20.

With the use of the corresponding-feature classification unit 106 (see FIG. 6) described above, a query about a feature associated with the information in the database 20 is generated from an input text.

In addition, there is no constraint on the type of expression used to enter a text. Specifically, it is not required that an input text have only structural expression or have only emotional expression. This enables the user to describe their desired conditions without paying attention to the expression of the text, that is, without constraint on the type of expression.

In other words, with the use of the corresponding-feature classification unit 106 according to this exemplary embodiment, a query constituted by a feature associated with the information in the database 20 can be generated from a text entered as desired by the user.

Other Exemplary Embodiments

While an exemplary embodiment of the present disclosure has been described, the technical scope of the present disclosure is not limited to the exemplary embodiment described above. It is obvious from the appended claims that various changes or modifications made to the exemplary embodiment described above are also included in the technical scope of the present disclosure.

While the exemplary embodiment described above exemplifies an image search system intended to be used in an architectural design firm, any image search system that receives input of text information may be used, regardless of whether the field used is architecture. In one example, the image search system may also be used for web search or document search.

In the exemplary embodiment described above, furthermore, it is assumed that a text is entered by a user and that premise information or a query image is also entered. Alternatively, non-text information may not be entered.

In the exemplary embodiment described above, furthermore, the output of the corresponding-feature classification unit 106 (see FIG. 3) is output to the feature correction unit 107 (see FIG. 3). Alternatively, the output of the corresponding-feature classification unit 106 (see FIG. 3) may be output directly to the search engine 108 (see FIG. 3).

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A query generation system comprising:
a database that stores information to be searched, the information being associated with features having a plurality of types of expressions;
a memory storing a plurality of dictionaries, the plurality of dictionaries including a first dictionary and a second dictionary, the first dictionary being associated with only a first type of expression of the plurality of types of expressions, the second dictionary being associated with only a second type of expression of the plurality of types of expressions; and
a processor configured to
when a first character string to be used to search the database is input without constraint on a type of expression, apply the first dictionary to a second character string having the first type of expression, which is included in the input first character string, to generate a query for a search from the second character string having the first type of expression, wherein
the plurality of types of expressions include an emotional expression type and a structural expression type,
the first type of expression is the emotional expression type,
the second type of expression is the structural expression type, and the processor is configured to apply the first dictionary to the second character string having the emotional expression type as the first type of expression to generate the query.

2. The query generation system according to claim 1, wherein the second character string having the emotional expression type is a character string that includes one or more words not containing a structural expression.

3. The query generation system according to claim 1, wherein the first dictionary defines a correspondence relationship between the second character string having the emotional expression type and a feature associated with the information in the database.

4. The query generation system according to claim 1, wherein the processor is configured to apply the second dictionary to a third character string having the structural expression type, which is included in the input first character string, to generate the query for the search from the third character string having the structural expression type.

5. The query generation system according to claim 4, wherein the second dictionary defines a correspondence relationship between the third character string having the structural expression type and a feature associated with the information in the database.

6. The query generation system according to claim 4, wherein
the processor is configured to apply the first dictionary and the second dictionary to a generated character string containing a noun included in a third dictionary and an adjective not included in the third dictionary to generate the query, the third dictionary being a dictionary containing structural information.

7. The query generation system according to claim 5, wherein the processor is configured to apply the first dictionary and the second dictionary to a generated character string containing a noun included in a third dictionary and an adjective not included in the third dictionary to generate the query, the third dictionary being a dictionary containing structural information.

8. The query generation system according to claim 4, wherein
the processor is configured to
apply the first dictionary and the second dictionary to the second character string in response to determining that the second character string contains only an adjective included in a third dictionary to generate the query, and
apply the first dictionary and the second dictionary to the third character string in response to determining that the third character string contains only an adjective included in the third dictionary to generate the query, and
the third dictionary is a dictionary containing structural information.

9. The query generation system according to claim 5, wherein the
the processor is configured to
apply the first dictionary and the second dictionary to the second character string in response to determining that the second character string contains only an adjective included in a third dictionary to generate the query, and
apply the first dictionary and the second dictionary to the third character string in response to determining that the third character string contains only an adjective included in the third dictionary to generate the query, and the third dictionary is a dictionary containing structural information.

10. A search system comprising:
a database that stores information to be searched, the information being associated with features having a plurality of types of expressions;
a memory storing a plurality of dictionaries, the plurality of dictionaries including a first dictionary and a second dictionary, the first dictionary being associated with only a first type of expression of the plurality of types of expressions, the second dictionary being associated with only a second type of expression of the plurality of types of expressions; and
a processor configured to
when a first character string to be used to search the database is input without constraint on a type of expression, apply the first dictionary to a second character string having the first type of expression, which is included in the input first character string, to generate a query for a search from the second character string having the first type of expression, and
search the database using the generated query, wherein
the plurality of types of expressions include an emotional expression type and a structural expression type,
the first type of expression is the emotional expression type,
the second type of expression is the structural expression type, and
the processor is configured to apply the first dictionary to the second character string having the emotional expression type as the first type of expression to generate the query.

11. A non-transitory computer readable medium storing a program causing a computer to execute a process for query generation, the process comprising:
maintaining a database that stores information to be searched, the information being associated with features having a plurality of types of expressions;
storing a plurality of dictionaries, in a memory, the plurality of dictionaries including a first dictionary and a second dictionary, the first dictionary being associated with only a first type of expression of the plurality of types of expressions, the second dictionary being associated with only a second type of expression of the plurality of types of expressions; and
when a first character string to be used to search the database is input without constraint on a type of expression, applying the first dictionary to a second character string having the first type of expression, which is included in the input first character string, to generate a query for a search from the second character string having the first type of expression, wherein
the plurality of types of expressions include an emotional expression type and a structural expression type,
the first type of expression is the emotional expression type,
the second type of expression is the structural expression type, and
the first dictionary is applied to the second character string having the emotional expression type as the first type of expression to generate the query.

12. A query generation system comprising:
a database that stores information to be searched, the information being associated with features having a plurality of types of expressions;

a memory storing a plurality of dictionaries, the plurality of dictionaries including a first dictionary, a second dictionary, and a third dictionary, the first dictionary being associated with only a first type of expression of the plurality of types of expressions, the plurality of types of expressions including an emotional expression type and a structural expression type, the first type of expression being the emotional expression type, the second dictionary being associated with only a second type of expression of the plurality of types of expressions, the second type of expression being the structural expression type, and the third dictionary being a different dictionary than the first dictionary and the second dictionary; and a processor configured to, when a first character string to be used to search the database is input without constraint on a type of expression, extract a second character string from the first character string, the second character string including a first word, determine if the first word is included in the third dictionary, in response to determining that the first word is included in the third dictionary, determine that the second character string has the first type of expression, and apply the first dictionary to the second character string having the emotional expression type as the first type of expression to generate a query for a search, and in response to determining that the first word is not included in the third dictionary, determine that the second character string has the second type of expression, and apply the second dictionary to the second character string having the structural expression type as the second type of expression to generate the query for the search.

* * * * *